INVENTOR.
NORMAN C. GITTINGER
BY
HIS ATTORNEY

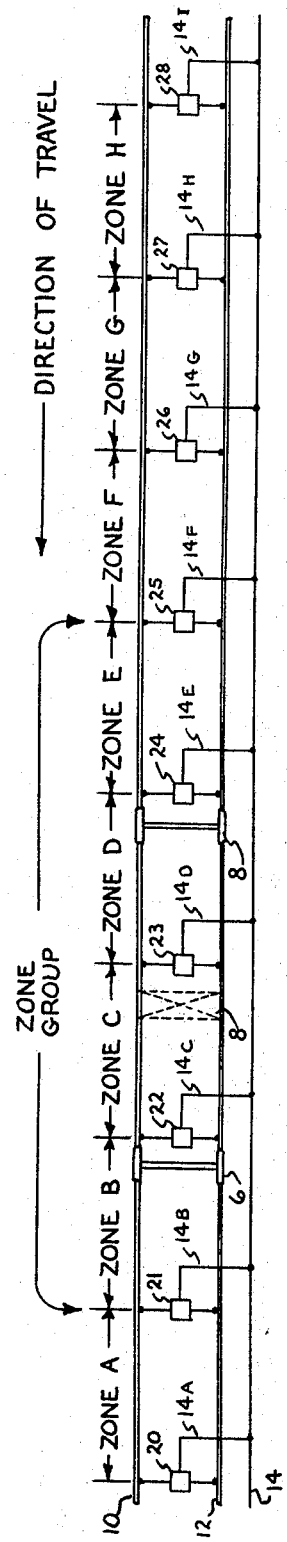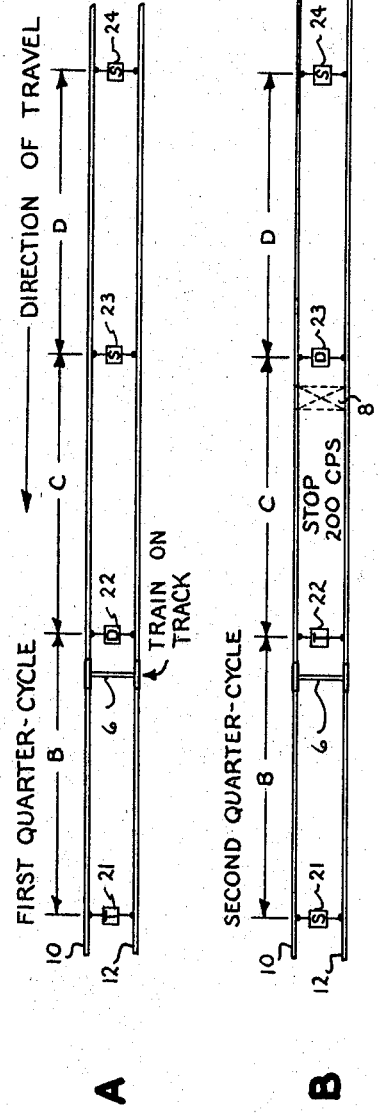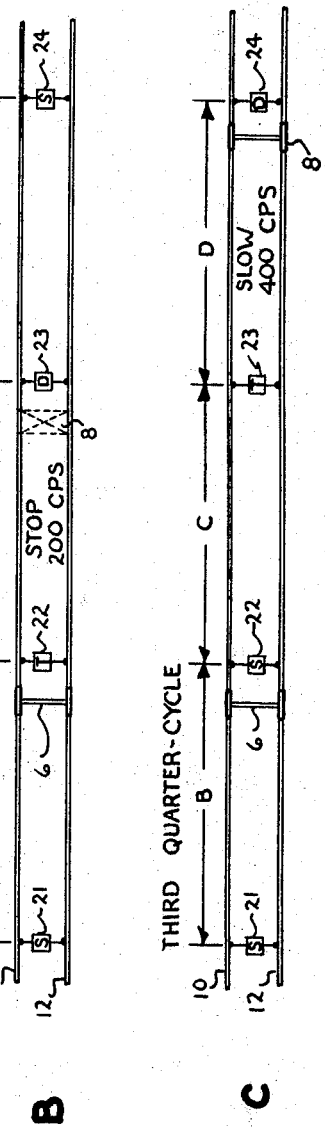
FIG. 1
FIG. 2
INVENTOR.
NORMAN C. GITTINGER
BY
HIS ATTORNEY Nov. 4, 1969  N. C. GITTINGER  3,476,932
RAIL VEHICLE LOCATION AND CONTROL SYSTEM
Filed March 14, 1967  4 Sheets-Sheet 4

UNITED STATES PATENT OFFICE 3,476,932
Patented Nov. 4, 1969

3,476,932
RAIL VEHICLE LOCATION AND CONTROL SYSTEM
Norman C. Gittinger, Schenectady, N.Y., assignor to General Electric Company, a corporation of New York
Filed Mar. 14, 1967, Ser. No. 623,031
Int. Cl. B61l 3/00, 21/00, 1/08
U.S. Cl. 246—187    21 Claims

ABSTRACT OF THE DISCLOSURE

A system for controlling the spacing between rail vehicles moving on a trackway. A series of variably operable electrical units are spaced along and operably connected to the trackway, each of the units operating to function successively as a transmitter, detector, and short circuit at different portions of a repetitive time cycle. The timing of performance of the aforesaid functions by the units along the right of way is such that in each portion of a time cycle one of the units operates as a transmitter, the next unit as a detector, and the next one or more units as a short circuit, with this pattern being repeated by other such units along the trackway. In the ensuing portions of each cycle, the aforesaid functions shift one unit down the line during each portion. As a result, shifting zone occupancy detection and indication zones are provided for detecting the presence or absence of a vehicle in each zone along the right of way and for indicating this information to a succeeding train in a previous zone.

BACKGROUND OF THE INVENTION

In conventional zone occupancy detection arrangements, a source of signal energy, which may be A-C or D-C, is located at one end of a signalling zone such as a section of railway track to provide a suitable signal therein. A receiver, which may include a track relay for example, is located at the other end of the signalling zone for receiving the signal energy from the source and is so arranged that the relay is normally energized to indicate the absence of a vehicle within the signalling zone and de-energized to indicate that a vehicle is present therein.

For example, when a track circuit is provided for a section of railway track, the track rails serve as the electrical conductors, and the signal energy applied thereto produces an inter-rail potential. When a train enters the section, its wheels provide a shunt across the track rails decreasing the inter-rail potential at the receiver to such an extent that the receiver becomes de-energized thereby indicating the presence of a train within the section.

While many prior systems used insulated track joints to define the limits of the zones, such an arrangement is, of course, not suitable for systems which employ continuously conductive track rails. In one particular prior art arrangement for use with continuously conductive track rails, low impedance connections across the track rails are used to define the limits of each signalling zone.

For certain applications, difficulty was experienced with this prior arrangement in that unless a sufficiently high frequency signal was employed, the receiver was required to be mounted an undesirably long distance away from the low impedance connection defining the zone limit. Because of the distributed inductance of the track rails, such a high frequency signal tended to be greatly attenuated so that reliable detection could be achieved only with relatively short signalling zones. Obviously, the distance between the receiver and the end of the zone constitutes a "blind spot" in which a train cannot be detected so that this distance must ordinarily be made as short as possible. Also, such prior arrangements were not readily adaptable to the intermittent travel of vehicles in opposite directions such as occurs in certain industrial applications. Moreover, since passage of a vehicle in one zone must be governed by the condition of traffic in advance, any speed signals transmitted to the zones to control the operation of the vehicle must reflect the occupancy condition of the advance zone and the zone signalling system should be readily adapted to provide such function.

SUMMARY OF THE INVENTION

The present invention relates to a zone type rail vehicle control system, wherein the speed and/or location of one rail vehicle may be controlled relative to the advance zone location of another rail vehicle and more particularly to a means of detecting and relaying this zone occupancy information.

The invention generally contemplates dividing the right of way into a series of shifting, rail vehicle location detection-and-indication zones, each of which is operable for a portion of a repetitive time cycle.

In a more specific aspect of the invention, each detection-and-indication zone is separated from the next spaced detection-and-indication zone in the same time interval by at least one signal suppression means which prevents cross-coupling between zones.

In a still more specific aspect of the invention, a plurality of zone units, usually three or more, are spaced along the right of way, timing means actuate each unit to cyclically perform the successive functions of a signal suppression means, a transmission means, a detection means and another signal suppression means; with each unit of a group being adapted to perform each of the aforesaid functions a preselected portion of the cycle after the performance of the same function by the previous unit, whereby the desired shifting detection-and-indication zones are achieved. For example, when four units are used for each group, each unit would be arranged to perform each of the functions one-quarter cycle later.

By the foregoing arrangement, a system is provided wherein transmitters, detectors, and short circuits are intermittently operable. In a preferred embodiment, the detector for a zone is a zone block length away from the nearest short circuit, thereby permitting the use of low frequency signals for a long zone length without a concurrent blind spot. Moreover, this system is readily adaptable to train travel in either direction as compared to conventional systems which are adapted for train travel in only one direction. As a result, this system can readily be adapted to industrial uses where trains are travelling intermittently in opposite directions on the same track. For example, the system once set up has a direction of operation inherent in it and this direction can be reversed by merely reversing the sequence of the synchronizing signals. Also, when used in combination with speed control signals, the system will not allow a vehicle to run in the wrong direction.

Another advantage of the invention, in one embodiment, is that it provides a system which lends itself to utilization of the track rails for propulsion current return where desired. Still another advantage of this system is that it accomplishes the foregoing advantages in a failsafe manner.

BRIEF DESCRIPTION OF THE DRAWINGS

FIG. 1 is a fragmentary schematic illustration of a detection system in accordance with the present invention;
FIGS. 2A–C are fragmentary schematic views illustrating the relaying of zone occupancy information to two preceding zones.

DESCRIPTION OF THE PREFERRED EMBODIMENTS

Figure 3:
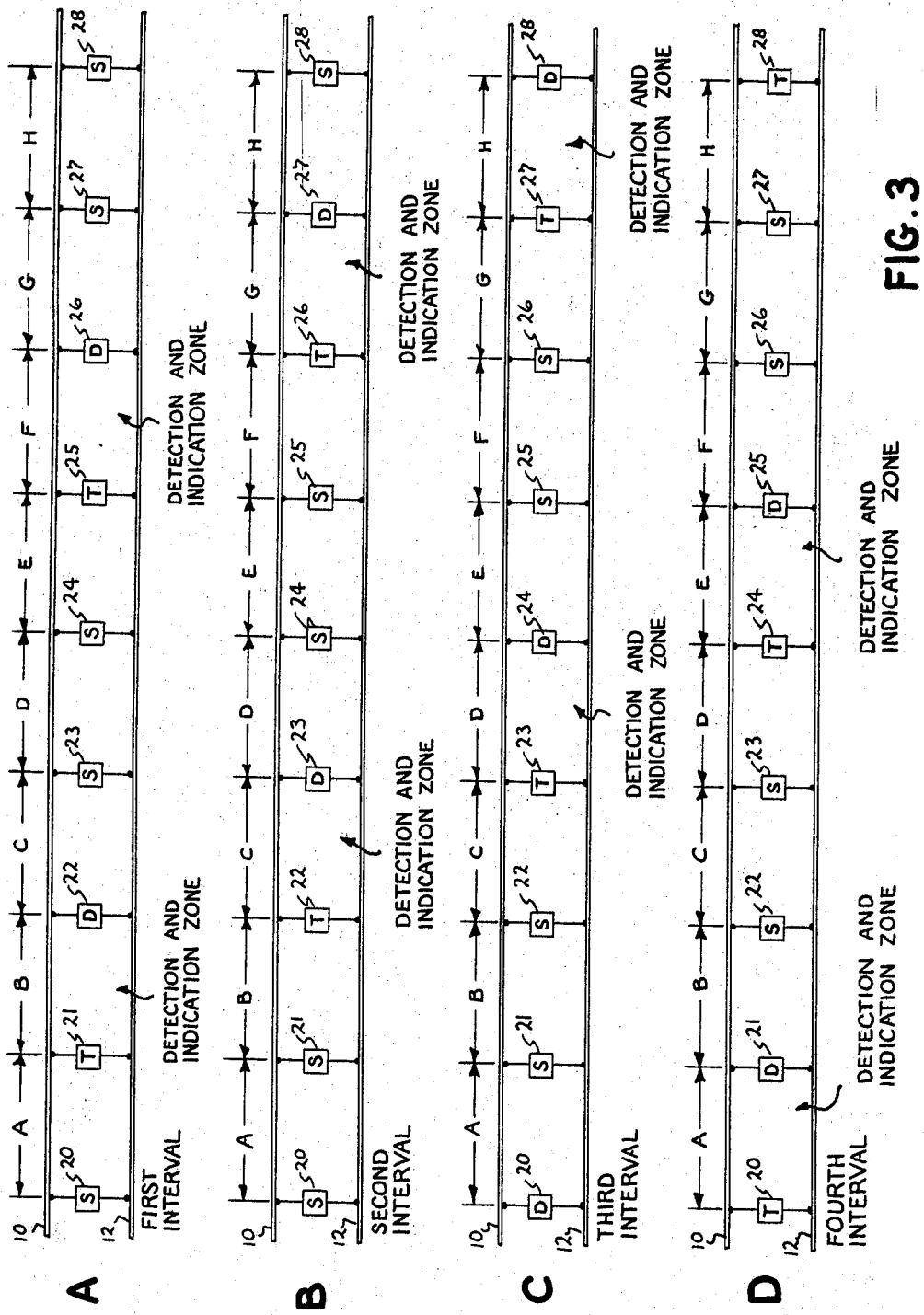
FIGS. 3A–D are fragmentary schematic illustrations of the progressive changes in functions of the zone units during one operating cycle.

In accordance with the present invention, a novel structure is provided to achieve the effective shifting of detection zones in a cyclical manner along a right of way. By such system, the presence of a rail vehicle within a zone is detected during one interval of a repetitive time cycle and the fact of such presence is indicated in another interval of the cycle to a train travelling in a preceding zone.

Referring now to the drawings, FIG. 1 and FIGS. 3A to 3D illustrate the operation of a preferred embodiment of the invention. A plurality of novel zone units, such as units 20–28 (FIG. 1), are spaced along a segment of track defined by rail sections 10 and 12. For purposes of illustration, the zones are shown as being relatively short, but in practice the zones may be quite long, such as 2,000 feet. As shown in FIG. 1, the space between adjacent units defines a zone. For example, zone B is located between units 21 and 22, zone C is located between units 22 and 23, and so forth. Thus, each unit forms a common border for two adjacent zones, and in accordance with the present invention, each unit is adapted to selectively perform one or more operations in the zones on either or both sides of the unit at different time intervals of a repetitive time cycle.

In the preferred embodiment illustrated in FIGS. 3A to 3D, the four selective operations performed by each unit during successive intervals of a time cycle are: (1) a detecting means, D, to receive a signal transmitted along the rails by an adjacent unit in the zone on one side of the detector and detect one or more of the signal's characteristics during one interval of a time cycle; (2) a variable characteristic transmitting means, T, to transmit along the rails in the next time interval for detection, in the zone on the other side of the unit, another signal of selective characteristics dependent on the characteristics of the signal detected in the previous time interval; (3) a signal suppression means, S, to suppress the transmission of signals along the rails past the unit at another time interval; and (4) another signal suppression means, S, to prevent transmission of signals past the unit at still another time interval. By the foregoing arrangement, and as can be seen, in FIGS. 3A to 3D, while the unit remains stationary, such as unit 22, for example, the operations it performs progressively change from a detecting means D (FIG. 3A) in one time interval, to a transmitting means, T, in the next time interval (FIG. 3B), to a signal suppressing means, S, in the following time interval (FIG. 3C, to another signal suppressing means, S, in the last time interval (FIG. 3D).

Each unit along the right of way performs each of the aforesaid operations one time interval later than the same operation is performed by the preceding unit, thereby establishing the desired shifting pattern of signal transmission and detection zone and of signal isolation zones—the latter zones preventing the cross coupling of signals between detection zones. By such arrangement, and as shown in FIGS. 3A to 3D, in each time interval, such as the first time interval, (FIG. 3A), one unit of a group of four units, such as unit 21, operates as a transmitting means T and the next unit, such as unit 22, operates as a detecting means D, thereby making the zone between the units a detection-and-indication zone for that particular time interval. In the same time interval, the next sequential unit, such as unit 23, operates as a signal suppressing means and the next unit, such as unit 24, operates as another signal suppressing means so as to establish three isolation or neutral zones, such as zones C, D and E (FIG. 3A) to prevent the cross coupling of signals between adjacent detection-and-indication zones, such as between zones B and F. In the next time interval, the operations performed by each unit changes whereby the next unit along the right of way performs the same type of operation performed by the preceding unit in the previous time cycle. For example, (FIG. 3B), in the next time interval, unit 22 changes its function to become the transmitting means for the new, or shifted, detection-and-indication zone, zone C.

Suitable switching, and/or memory means, described hereinafter, associated with each unit, such as unit 22, varies a characteristic of the signal transmitted in zone C by unit 22, with the variation being representative of the conditions detected by the unit 22 in the preceding time cycle. The characteristics detected by the detector of unit 22 in the preceding cycle will depend upon the type of signal energy applied. For example, the characteristic detected may be a drop in signal level, thus indicating the presence of a train in zone B. Alternatively, detector 22 may detect a particular frequency, or some other characteristic depending upon the means used for coding the signal energy, indicating the presence of a train in zone A. The detected change in the characteristic, for example, the drop in signal level, will be caused by the shunting effect of the wheels and axle of a train in zone B. Similarly, the change in frequency will be caused by a previous unit sending out a coded signal in the form of a frequency change to indicate that its zone, such as zone A, is occupied. Unit 22, when it becomes a transmitting means is actuated by a memory means (discussed hereinafter) which may be arranged, for example, to send out one frequency if it detected zone occupancy in zone B during the preceding interval, a different frequency if it detected a particular frequency signal, and a still different frequency if the signal received by it is of normal level and frequency indicating that zone A and zone B are unoccupied. A train (not shown) entering zone C will then receive through the rails in the second time interval of each cycle the frequency signal transmitted by unit 22 thereby indicating to the train the condition of advance zone occupancy. The foregoing is given by way of example only and any other means of coding the signal energy may be used.

The operation of the system to relay zone occupancy information is illustrated in more detail in FIGS. 2A to 2C wherein three successive quarters of a four quarter time cycle are shown. In the first quarter cycle, unit 22 performs as a detector, D, to detect the presence of train 6 in zone B due to the drop in level of the signal transmitted by unit 21 and to store this detected information by memory means; in the second quarter cycle (FIG. 2B) unit 22 acts as a transmitter, T, actuated by the stored information to transmit a "STOP" signal in zone C to any train entering zone C. In the second quarter cycle, the next unit down the line, unit 23, performs as a frequency sensitive detector to detect the "STOP" signal (should no train be present in zone C). In the third quarter cycle (FIG. 2C) unit 23 then operates as a transmitter in zone D to transmit a "SLOW" signal to any train entering zone D. Since each cycle is relatively short, preferably less than about one second, a succeeding train will receive zone occupancy information in pulsations which are sufficiently closely spaced to provide substantially continuous zone occupancy information. The succeeding train 8 may pick up these pulses from the rails by suitable inductive coupling means known in the art. By the foregoing arrangement, an accurate train detection system is provided which permits the use of long zones with correspondingly low transmission frequencies wherein a unit acting as a detector is always one zone length away from the nearest short circuit.

The number of units required, and the maximum length of the zone formed between each unit will depend on the attenuation of the particular range of frequencies selected for the transmitting components of the units and the sensitivity of the unit detector components. One of the advantages of the present system is that it permits the use of low frequencies, and thus greater zone lengths since the nearest short circuit is one zone length away from the nearest detector. In addition, the system eliminates blind spots at zone borders where the presence of a train cannot be detected. The minimum length of a zone, where the zone occupancy information is to be relayed only one zone, is the maximum stopping distance for a vehicle travelling at maximum speed, plus a safety factor of at least the distance such train would travel at maximum speed in the time interval of one detection cycle. Where the system is adapted to relay the zone occupancy information more than one zone, whereby an oncoming train can be given commands of slower speeds, the zone length can be shortened, such as in approaches to a station, to the maximum stopping distance for a train travelling at such slower speed with a similar added safety factor.

The signal suppressing means, S, may be any means adapted to suppress the signal originating in one detection-and-indication zone from being detected in the adjacent detection-and-indication zone. In the preferred embodiment, illustrated in FIGS. 3A to 3D, this is accomplished by presetting each unit to act as a short circuit across the rails for the one-half cycle between its function as a transmitter and its function as a detector thereby establishing three isolation zones wherein the signal from any transmitter is prevented from entering the middle of the three isolation zones—with the middle zone thus acting as a complete barrier to cross-coupling of signals. For example, in the first quarter cycle, FIG. 3A, units 23 and 24 perform as short circuits to establish the middle isolation zone D which prevents signals from unit 25, acting as a transmitter, T, from being detected by unit 22, acting as a detector D. Zone D similarly prevents cross-coupling of signals from unit 21 to unit 26.

Figure 4:
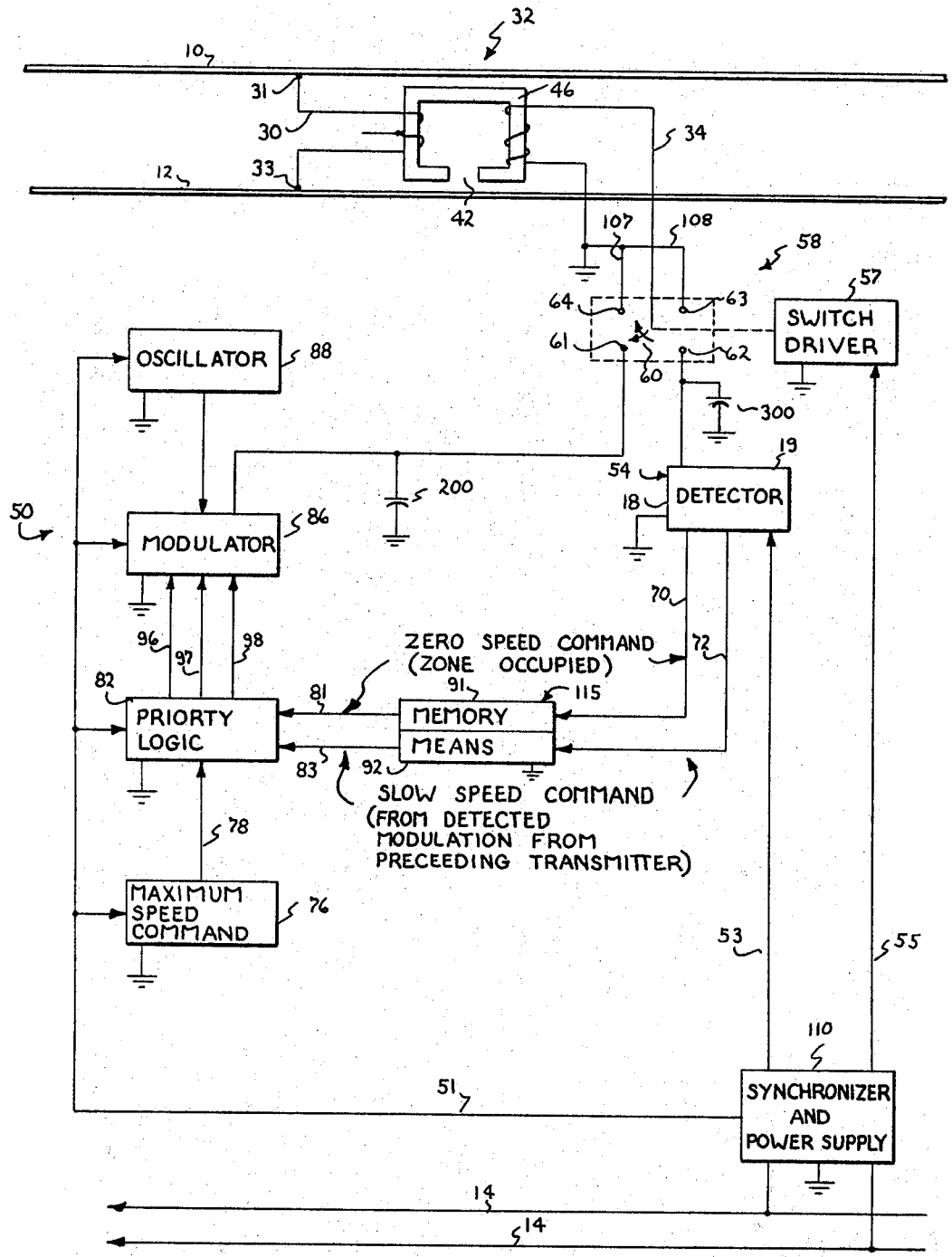
FIG. 4 is a fragmentary schematic illustration of one form of zone unit in accordance with the present invention.

A preferred means for establishing the short circuit function for each unit and for sequentially connecting the various components of the unit in the rail circuit at the proper portion of the cycle is shown in FIG. 4. As shown, a first winding 30 of a transformer 32 is connected across the rails 10 and 12, as at points 31 and 33. In order to also provide a return for the rail vehicle propulsion current, the first winding 30 is preferably a heavy gage track winding having only a few turns of wire so as to have a low D.C. or 60 cycle impedance and is provided with a center tap.

The first winding 30 is wound about a core 46 having an air gap 42 to prevent saturation due to propulsion currents. A second winding 34 is also disposed about the core 46 and has its ends connected through a sequence switch, shown generally at 58, selectively to a detecting means 54, a transmitting means 50 and means to short circuit the ends of the second winding 34, such as through leads 107 or 108 and switch arm 60. Winding 34 may be of small wire and of any suitable number of turns.

When arranged in the foregoing manner, the first winding 30 acts as (1) a short circuit for signals travelling along rails 10 and 12 when the second winding 34 is short circuited on itself, (2) as the primary of transformer 32 to couple signals from the rails 10 and 12 to the unit when the second winding 34 is connected by the sequence switch 58 to the detecting means 54, and (3) as the secondary of transformer 32 to couple signals to the rails 10 and 12 when the transmitting means 50 is connected by the sequence switch 58 to the second winding 34.

Conveniently, first winding 30 may also exhibit a low impedance at the signal frequency as well at at D-C or 60 cycle per second A-C. This may be accomplished by providing suitable capacitance connected so as to resonate the second winding 34 of transformer 32 during the detection and transmission portions of the cycle. For example, capacitance 200 and 300 may be connected as shown in FIG. 4 to resonate winding 34 during the respective detection and transmission portions of the cycle. Alternatively, a single capacitance may be employed in combination with a suitable switching means.

In the foregoing described arrangement, a high impedance can be reflected to the first winding 30 during the detection and transmission portions of the cycle even though the impedance of the winding itself is low. Winding 30 therefore may be selected to have a low impedance at the signal frequency thereby assuring considerable shorting action even though the winding 34 may fail to provide the desired short during the shorting portion of the cycle. Also, since winding 30 need have only a few turns, less problems are presented due to propulsion current saturation. Also, the foregoing arrangement operates in a fail-safe manner, even to the mechanical disconnection of the short from the rails, since a disconnected unit will not function as either a detector or a transmitter thereby producing an occupancy indication, which is fail-safe. Any other failure also causes the unit to produce an occupancy indication. For example, excecept for a burn-out or disconnect of winding 30 which removes the short while producing an occupied indication all other failures produce the occupied indication while maintaining the shorting action. Further, the arrangement for resonating winding 34 causes the low impedance short to be created when the capacitance is disconnected which is fail-safe.

The sequence switch 58 may be any suitable static or dynamic device. For purposes of illustration, a rotary switch is schematically shown wherein a switch arm 60 rotates in the direction shown to successively establish contact between the ends of the second winding 34 and the sequential contacts 64, 63, 62 and 61 which respectively are the contacts for a short circuit, another short circuit, a detector, and a transmitter. The short circuits are established when arm 60 engages contacts 64 or 63, since one end of the arm 60 is connected to one end of the second winding 34, and contacts 63 and 64 are connected by conductors 108 and 107, respectively, to the other end of the second winding 34 thereby completing the short circuit. The connection of the second winding 34 to the detecting means 54 and transmitting means 50 is established when arm 60 engages respective contacts 62 and 61, since one end of the second winding 34, the transmitting means 50, and the transmitting means 54 are grounded, and since the output of transmitter 50 is connected to contact point 61 and the input of detector 54 is connected to contact 62.

Figure 5:
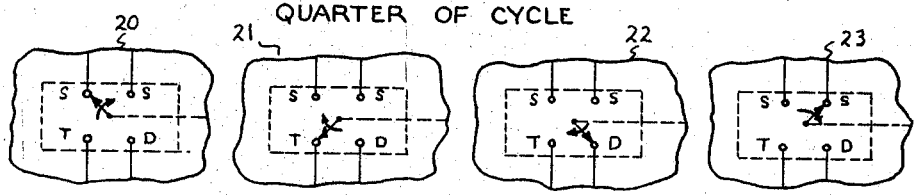
FIG. 5 is a fragmentary schematic view of the switching disposition for four adjacent sequential units at the first quarter of a four quarter cycle.

Since the switch arm 60 is adapted to progressively engage contacts 64, 63, 62 and 61 for one-quarter of each cycle as it rotates, the rotation being actuated by a synchronizing system described hereinafter, the point of commencement of the sequence for each unit 20-28 may be determined by the initial setting of the rotating arm 60. As shown in FIG. 5 for units 20-23, the desired quarter cycle displacement of function of each unit along the right of way is achieved by initially setting the switch arm 60 one-quarter turn behind the next advance unit. The setting for the next group of units, the second group of FIG. 1, comprising units 24-28 will be the same as for their respective counterparts of units 20-23. Such a setting will establish the location and shifting of zones illustrated in FIGS. 3A to 3D.

In order to insure that all units will change their respective functions at the same time, a common source to trigger the functional changes is preferred. A preferred means of accomplishing the simultaneous change of functions is shown in FIG. 1 wherein a transmission line 14 parallels the rails 10 and 12 and carries the same synchronizing signal during each portion of the cycle to all units as by conductors 14A to 14I. By this means, each unit will perform and change its function at the same time adjacent units are performing and changing their functions so that the proper arrangement of zones, such as shown in FIGS. 3A to 3D will be maintained for each portion of the cycle of operation. The synchronizing signals may be any suitable cyclical series of signals (not shown) having a different characteristic for each portion of the cycle. For example, where a frequnecy system is used with a four unit arrangement, a first frequency F1 could be transmitted at the first quarter of the cycle; a second frequency, F2 at the second quarter cycle; a third frequency, F3 at the third quarter cycle and a fourth frequency, F4 at the fourth quarter cycle. The aforesaid order of transmission would then be repeated in each successive cycle.

The synchronization signals may be transmitted along the transmission line 14 by any suitable means such as, for example, by a transmitting means (not shown), having a modulator to provide selectively four different frequencies, and a cyclically operating time switch (not shown) to sequentially actuate the modulator to provide the required number of frequencies sequentially at the desired time intervals. Conveniently, and to assure fail-safe operation, these same synchronizing frequencies may be utilized to power the proper portions of the circuits. Alternatively, the transmission line 14 may be used to carry the synchronizing signals as well as the power for each of the units 20–28. The synchronization and power frequencies may then be separated at each unit, such as by a synchronizer and power supply unit 110 (FIG. 4) having suitable filters and rectifiers. The rectified power is then fed by conductor 51 to the transmitter 50 and by conductor 53 to the detector 54. The synchronization frequencies are fed by conductor 55 to the switch driver 57 which may have suitable frequency sensitive means such as filters, to cause the arm 60 to rotate to a particular quarter turn at each successive frequency. For example, each frequency must cause arm 60 to be moved to a particular position not merely advance one position. Since each unit is preset to perform its functions one-quarter cycle behind the performance of the same function by the previous unit, as previously stated, the arrangement of zones as shown in FIGS. 3A to 3D is achieved in accordance with each change in the four successive synchronization signals of each cycle.

The detecting means 54 for each unit may be any suitable detector for detecting the presence of a train in the zone in which the associated transmitter is located (the zone to the left of the detection unit in FIGS. 3A to 3D). For example, detecting means 54 may include a threshold level detector 18 (FIG. 4) which provides an output when the signal detected is above a predetermined threshold level and zero output where the signal received is below this level. The threshold level is set so that the shunting effect of the wheels and axle of a train located within the zone, such as train 6, in FIG. 2A will cause the signal detected by the detector (unit 22 in FIG. 2A) to fall below the threshold so that the detector 18 (FIG. 4) will produce a zero output indicative of train presence within the relay-and-detection zone B.

Any suitable memory means 115, such as a time delay circuit 91 (FIG. 4), may be used to store the output of the detector 18 until the next portion of the cycle when this stored information may be used to vary the output characteristics of the same unit when it performs as a transmitter.

The transmitting means 50 (FIG. 4) for each unit may be any suitable variable characteristic transmission means, such as a frequency modulated transmitter. The modulator 86 of the transmitting means may be connected to the output of the memory means 115 whereby the particular frequency produced by the transmitting means is varied in accordance with the output of the memory means 115. Thus, the frequency transmitted along the rails of a succeeding zone, such as zone C of FIG. 2A, is indicative of the occupancy of the preceding zone B. This variation in signal characteristic may then be employed to signal a train entering zone C of the advance occupancy of zone B, or, where there is no train in zone C, to be first step in the relay of the zone B occupancy information to zone D.

For example, the transmitter of each unit can be adapted to produce a frequency output indicative of a "FULL SPEED" command, such as 600 c.p.s. Thus when no train is present in zone B, the output of unit 22 along the rails of zone C is the "FULL SPEED" 600 c.p.s. frequency. However, when unit 22 detects a train in zone B (FIG. 2A), the resulting zero output from the unit memory means 91 (FIG. 4) during the next quarter cycle (FIG. 2B) causes the unit 22, when it performs as a transmitter, to produce a "STOP" output of, for example, a frequency of 200 c.p.s. along the rails of zone C.

Where it is desired to relay the information regarding occupancy of one zone, such as zone B, to two zones, such as to zones C and D, it is preferred that the detecting means 54 also has a signal frequency detector 19 which is sensitive to change in the frequency of the signal received by it. For example, the frequency sensitive means 19 (FIG. 4) of unit 23 (FIG. 2B) may comprise a band pass filter which will pass only that frequency which is indicative of occupancy of zone B, such as 200 c.p.s. in the example of FIG. 2B. This output will be fed to the time delay circuit 92 of memory means 115 where it will be stored to actuate the output of unit 23 (FIG. 2C) when it becomes a transmitter in the next portion of the cycle. Similarly, the modulator 86 (FIG. 4) must be constructed so as to be able to produce an additional output frequency of, for example, 400 c.p.s., which is a "SLOW" speed command to an oncoming train.

Figure 6:
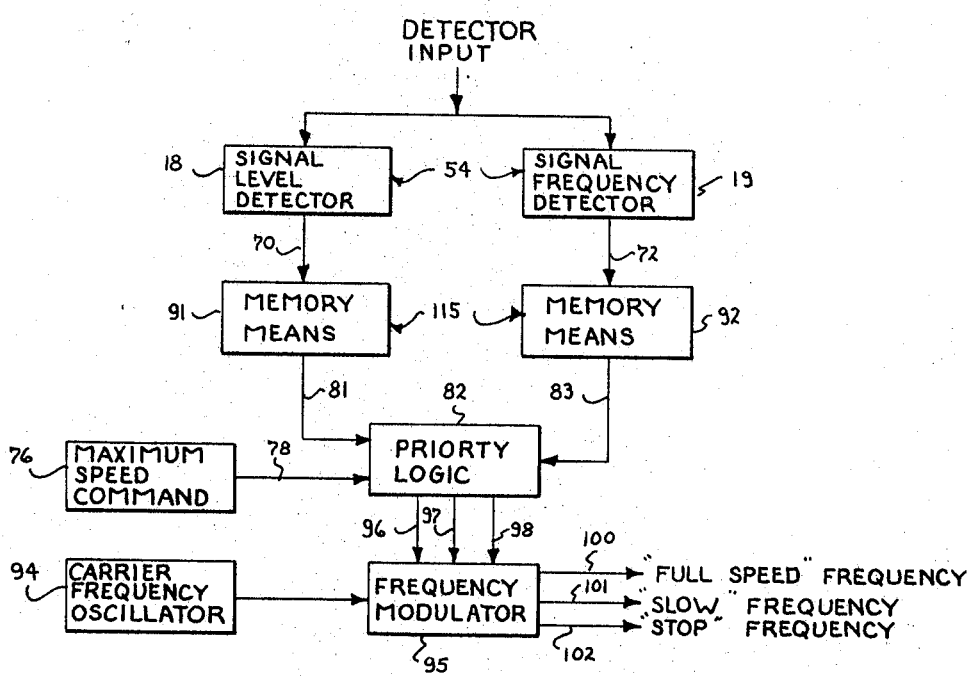
FIG. 6 is a fragmentary schematic view illustrating the use of detected track occupany information to vary the transmitter frequency of the unit.

Since the modulator 86 (FIG. 4) must respond to one or the other of the outputs of the time delay circuits 91 and 92 in a priority fashion, it is preferred that priority logic means 82 (FIGS. 4 and 6) be provided to actuate the modulator 86 to produce the proper output frequency. The priority logic means 82 may receive inputs from a constant output maximum speed command component 76 (FIG. 4) by conductor 78, from the time delay circuit 91 for the signal level detector 18 of the detecting means 54 by conductor 81, and from the time delay circuit 92 for the signal frequency detector 19 of the detecting means 54 by conductor 83. The priority logic means 82 (FIGS. 4 and 6) may be a suitable switching arrangement which gives first priority to a zero input from conductor 81, second priority to an input from conductor 83, and third priority to an input from conductor 78. The priority logic means 82 may be, for example, a series of over-riding switches. The modulator 86 (FIG. 4) may have suitable switching means (not shown) to selectively modulate the output of oscillator 88 in accordance with three modulating frequencies which are selectively switched into actuation by respective inputs from conductors 96, 97 and 98. Thus at any period of time, there will be an output only along one of the conductors 96, 97 and 98, with the particular conductor which is carrying a signal being determined by the priority logic means 82. For example, an output along conductor 96 could switch the modulator to produce a frequency of 600 c.p.s. as a "FULL SPEED" signal; an output along conductor 99 could activate a 400 c.p.s. signal as a "SLOW" signal and an output along conductor 98 could switch into operation a 200 c.p.s. signal as a "STOP" signal. The frequency outputs being illustrated by arrows 100 to 102 in FIG. 6. The output of the modulator 86 may be fed through a suitable amplifying means (not shown) to the switch contact 61 (FIG. 4) whereby the output of the transmitting means 50 is applied to the rails 10 and 12 by the transformer 32 when the switch arm 60 engages contact 61 at the proper quarter cycle of operation.

Where a frequency modulation system is used, the frequency detector 19 of the detecting means 54 will include means (not shown) to detect the modulation frequencies from the carrier frequencies.

By the foregoing arrangement a novel system of shifting detection zones is provided whereby at any instant in time a detector is at least one zone length away from the nearest short circuit. Also, a more fail-safe operating system may be provided by using a resonating capacitance for transformer second winding 34 in combination with a transformer first winding 30 of low impedance. Moreover, since the system has an inherent direction of operation in it, operation of a vehicle in the wrong direction is readily prevented and reversing of the direction may be also provided by merely reversing the sequence of the synchronizing signals.

While only preferred features of the invention have been described in detail, it is to be understood that many modifications and changes will occur to those skilled in the art. The appended claims, therefore, are intended to cover all such modifications and changes as fall within the true spirit and scope of the invention.

What I claim as new and desire to secure by Letters Patent of the United States is:

1. In a system of rail vehicle location detection of the type utilizing a plurality of zone groups extending along a pair of continuously conducting rails, each of said zone groups comprising detection and transmission units and means for preventing the undesired transmission of signals from the transmission unit of one zone group to detectors of a different zone group, the combination comprising in each zone group a plurality of multi-operational units spaced along said rails, each of said units comprising: detecting means, variable characteristic transmission means, and switching means connected to sequentially actuate said detecting and transmission means, said detecting means being adapted for receiving signals from said rails during a first interval of a time cycle and detecting at least one characteristic of said signals, said variable characteristic transmitting means being adapted to transmit other signals along said rails only at a subsequent interval of the time cycle, and memory means operably connected between said detecting means and said transmitting means so as to vary at least one characteristic of said other signals in accordance with at least one characteristic detected by the detecting means during said first interval.

2. In a system according to claim 1, including timing means adapted to control the actuation of the said transmitting means and said detecting means of sequential units, whereby in a time interval in which a particular unit is actuated to operate as a transmitting means an adjacent unit is actuated to operate as a detecting means.

3. In a system according to claim 1, wherein each of said units includes signal suppression means adapted to suppress the passage of signals generated by other units during at least one other time interval.

4. A system of rail vehicle location detection comprising, a pair of rails, a plurality of sequential zones disposed along said rails, multi-operational units disposed at the ends of each zone, each unit being adapted to sequentially perform at successive portions of a repetitive time cycle the operations of means to detect at least one characteristic of a signal received by it from said rails during one interval of the time cycle, a variable characteristic transmitting means adapted to transmit at least one other signal along said rails during a subsequent interval of the cycle, and signal suppressing means adapted to suppress the passage of still other signals generated along said rails by one of the other units, each sequential unit along the rails being adapted to sequentially perform each of the said operations a time interval later than the previous unit along the rails is adapted to perform the same type of operation, switching means associated with each said unit and operably connected between the transmitting means and the detecting means whereby at least one characteristic of the said other signal transmitted by the transmitting means is determined by at least one characteristic of the signal detected by the detecting means so that the presence of a rail vehicle in a zone indicated by a particular characteristic of a signal detected by a unit operating as a detector in that zone for one interval of each cycle is indicated to another rail vehicle in another zone by a particular characteristic of the signal transmitted in such zone during a subsequent time interval of each cycle.

5. A system according to claim 4, wherein said detecting means is adapted to detect a signal having at least two characteristics, one of said characteristics being due to the rail vehicle zone occupancy condition of a zone which the detecting means terminates and said other characteristic being due to the rail vehicle zone occupancy condition of an advance zone, and wherein said variable characteristic transmitting means is adapted to transmit a signal having characteristics indicating the detected condition of zone occupancy.

6. A unit for use in a rail vehicle location detection system comprising variable characteristic transmitting means adapted to transmit signals along a trackway, detecting means adapted to detect at least one characteristic of another signal from said rails, signal suppressing means adapted to suppress the passage of signals past said unit, and switching means adapted to actuate each of said means in a selective sequence in selective intervals of a repetitive time cycle.

7. A unit according to claim 6 including memory means adapted to vary the characteristics of the signal transmitted by said signal transmitting means in one time interval relative to at least one characteristic detected by said detecting means in a previous time interval.

8. A unit according to claim 6 including non-saturating transformer means having a primary winding and a secondary winding; means connecting said primary winding across the rails of said trackway; and switching means adapted to operably connect said secondary winding selectively to said transmission means, said detecting means and said signal suppressing means.

9. A unit according to claim 8 including capacitance means adapted to be operatively associated with said secondary winding to resonate said secondary winding at the signal frequency during the times said secondary winding is operably connected to said transmission means and said detection means.

10. A unit according to claim 8 wherein said transformer means has an air core.

11. A unit according to claim 8 wherein said transformer means includes a core having an air-gap to prevent saturation during operation.

12. The unit according to claim 9 wherein said transformer means includes a core having an air-gap to prevent saturation during operation.

13. A unit according to claim 8, wherein said signal suppressing means includes means to short circuit said second conductor means.

14. A unit according to claim 6, including means to actuate said switching means in a preselected sequence.

15. A unit according to claim 14 wherein said means to actuate said switching means in a preselected sequence is a synchronization signal.

16. A unit according to claim 14 wherein said means to actuate said switching means in a preselected sequence is a power signal.

17. A unit for use in a rail vehicle location detection system comprising a core, a first winding adapted to be connected at its ends across a pair of rails and disposed intermediate its ends about said core, a second winding disposed intermediate its ends about said core in an inductive coupling relationship to said first winding, said second winding having its ends operably connectable by a switching means selectively to a transmitting means wherein said second winding operates as a primary and said first winding operates as a secondary to couple signals from said transmitting means to said rails, and to a detecting means wherein said first winding operates as a primary and said second winding operates as a secondary to couple signals from said rails to said detecting means.

18. A unit according to claim 17, including means to short circuit said second winding on itself, selectively and operably connectable by said switching means to said ends of said second winding, wherein said first winding operates as a shunt across said rails.

19. In a zone occupancy detection system for traction vehicles operating on a continuous trackway wherein a zone group comprises transmission and detection units interposed intermediate signal suppression units, means for sequentially shifting zone groups longitudinally along the trackway, comprising: a plurality of electrical units spaced along and operably connected to the trackway, said units being variably operating to function successively as signal suppression, transmission and detection devices during consecutive portions of a repetitive time cycle, means to synchronously actuate the units whereby each unit performs one of said functions a preselected portion of a time cycle after the performance of the same function by the previous unit.

20. The system of claim 19 wherein each of said units is displaced a substantially equal length from its adjacent units.

21. The system of claim 20 wherein the units are arranged so that a signal suppression unit is separated by one of said equal lengths from its nearest detector.

References Cited
UNITED STATES PATENTS

| | | | |
|---|---|---|---|
| 3,145,957 | 8/1964 | Ihrig | 246—167 |
| 3,309,516 | 3/1967 | Baughman | 246—63 |
| 3,337,727 | 8/1967 | Freeman | 246—167 |
| 3,361,905 | 1/1968 | Baughman | 246—187 |

DRAYTON E. HOFFMAN, Primary Examiner

U.S. Cl. X.R.

246—34, 63